… … …

United States Patent Office 3,003,971
Patented Oct. 10, 1961

3,003,971
STABILIZED TERTIARY N-CHLOROUREA
COMPOSITIONS
William W. Prichard, Claymont, Del., assignor to E. I. du Pont de Nemours and Company, Wilmington, Del., a corporation of Delaware
No Drawing. Filed Apr. 6, 1944, Ser. No. 529,826
8 Claims. (Cl. 252—187)

This invention relates to new compositions of matter and more particularly to the treatment of fabrics and clothing for protection against the action of mustard gas and similar vesicants.

This application is a continuation-in-part of my application Serial No. 474,629, filed February 3, 1943, now Patent No. 2,774,507, of my application Serial No. 487,532, filed May 18, 1943, and now abandoned, and of my application Serial No. 487,533, filed May 18, 1943, now Patent No. 2,765,075.

It is known that the compounds herein referred to as "tertiary N-chloroureas" are of value for protecting fabrics and other articles against the penetration of vapors of vesicants of the type represented by $\beta,\beta'$-dichlorodiethyl sulfide. However, these tertiary N-chloroureas have a tenderizing effect on fabrics, particularly of the cellulosic type, with the result that the fabric eventually becomes weak and unsuitable for use in clothing. The tertiary N-chloroureas also undergo decomposition with loss of chlorine, with the result that, after varying perods of time on the fabric, they lose their efficiency. The tertiary N-chlorourea-treated fabrics are, furthermore weakened by exposure to mustard gas vapor, and, if the exposure is severe, they are unsuited for decontamination and reuse.

This invention has as an object the production of new and useful compositions of matter. A further object is a composition which gives to cellulosic materials, and particularly clothing, protection against penetration of vesicant vapors without the deterioration in the fabric that previously accompanied the treatment of cloth for this purpose, and without loss of the permeability to air which is essential in most types of clothing. A further object is the manufacture of new and useful products comprising cellulosic material treated with the new composition described herein. Further objects reside in methods for obtaining the above mentioned compositions and products. Other objects will appear hereinafter.

The above objects are accomplished through the preparation of compositions comprising a tertiary N-chlorourea and a compound of an element of atomic number of from 24 to 30 inclusive (i.e., chromium, manganese, iron, cobalt, nickel, copper, and zinc) with an acid having a dissociation constant less than about $1.5 \times 10^{-2}$, said compound being substantially non-reactive with the tertiary N-chlorourea under formulation conditions.

I have found that the inclusion of a small amount of a compound of the kind just mentioned (referred to herein as the stabilizer) in the coating or impregnating composition containing the tertiary N-chlorourea will overcome or greatly lessen the difficulties previously pointed out. Particularly advantageous for the present purpose are tertiary N-chlorourea compositions containing zinc oxide as the stabilizer. When compositions of the kind described herein are applied to cellulosic materials, such as fabrics, the action of the tertiary N-chlorourea, its decomposition products, and its reaction products with vesicants on the cellulose is considerably reduced and in many instances practically eliminated, the fabric retaining substantially its original strength for long periods while still permitting passage of air therethrough. Also, in most instances, the loss of active chlorine from the tertiary N-chlorourea in contact with the cellulose is retarded, thus prolonging in still another way the period during which the treated material will serve its intended purpose.

The action of the stabilizers of this invention, when used with the tertiary N-chlorourea on cellulosic materials, such as fabrics, is maintained longest (i.e, there is less tendering of the fabric and loss of active chlorine) if the treated fabric is stored or otherwise kept at a relative humidity of less than 50%, preferably less than 10%, especially when the fabric is or may be subjected to high temperatures.

By the expression "tertiary N-chlorourea" is meant a compound containing the urea nucleus (i.e., a carbonyl group attached to two trivalent nitrogen atoms), at least one and preferably both of these nitrogen atoms being attached to chlorine atoms, the other valence of the nitrogen atoms being satisfied by carbon atoms.

The manner of compounding the tertiary N-chlorourea/stabilizer composition, and the auxiliary ingredients to be included, will depend upon the purpose for which the composition is intended and the conditions under which it is to be used.

In instances where washfastness of the impregnated material is of paramount importance, it is preferable to use dispersions of the stabilizer and the tertiary N-cholorurea in suitable organic solvents. Such dispersion can be made in one way as follows: In order to obtain a concentrated slurry, the stabilizer is first dispersed in a small amount of the solvent in a device such as a colloid mill and in the presence of a suitable dispersing agent; the tertiary N-chlorourea and the binder are separately dissolved in the principal and remaining amount of the solvent; and the slurry of the stabilizer is then added to this solution with suitable agitation. Upon application of the resulting dispersion to a cellulosic fabric, a marked protective effect on the strength of the fabric is obtained, as well as a stabilizing action on the tertiary N-chlorourea. The finish is also resistant to repeated launderings. Examples I, II and XVI are illustrative of dispersions in organic solvents.

In instances where transportation and storage problems are important, and where the composition is to be used within a short period of time, a satisfactory procedure is to formulate the composition as a self-emulsifiable paste which can be readily dispersed in water at the time and place of use. Such pastes are normally prepared by mixing mechanically, in an apparatus designed to handles masses of doughy consistency, the tertiary N-chlorourea in finely divided (about 1–5 microns) form, the stabilizer, a binder, and a dispersing agent which is non-reactive to the tertiary N-chlorourea and preferably liquid at room temperature. This mixture is masticated until it attains a putty-like consistency, after which it is placed in sealed containers until ready for use. Examples III, IV and XV are illustrative of water-dispersible pastes.

It is possible to combine the stabilizer and tertiary N-chlorourea in the form of a dry powder, usually to be dispersed in water at the time of use, the binder being added to the dispersion at that time if one is required for the particular use intended. Such dry mixtures may be stored for long periods of time in cellulosic (e.g. paper) containers without injury to the container and they show remarkable stability even under hot and humid conditions. Example V illustrates this variation of the invention.

In instances where the composition is to be used within a few weeks without further mixing operations, and in which only a moderate degree of washfastness in the treated material is necessary, it is most practical to prepare the tertiary N-chlorourea/stabilizer composition in the form of an aqueous dispersion. This is also desirable where there are health or fire hazards at the time and place of use, or when economy and availability of the dispersing medium must be considered. One good method of preparing such aqueous dispersion is as follows: the tertiary N-chlorourea, stabilizer and dispersing agent are ground in a ball mill in the presence of water until a particle size of about 1 to 5 microns is obtained; the binder is emulsified separately in any suitable turbulent flow device such as a colloid mill or a centrifugal pump; the slurry from the ball mill grind is blended with the emulsion of the binder by stirring the two together; and the dispersion is then diluted to the desired strength. Another good method for making them is to prepare a mixture of the stabilizer and finely divided tertiary N-chlorourea as is described in more detail in Example V, add this mixture to the emulsion of the binder, and pass the resulting composition through a turbulent flow device. Examples VI to XV inclusive illustrate various aqueous dispersions.

The particular methods for application and use of the stabilized tertiary N-chlorourea compositions of the present invention will depend upon the form of the composition and the character of the material or object to which it is to be applied. Thus the powders and pastes previously referred to, although they can be applied as such, will normally first be dispersed in a suitable liquid medium. If the object or surface to be treated is stationary, the liquid composition may be applied in any conventional manner, as by spraying or brushing or with an absorbent material such as a sponge. If, as is more frequently the case, the material to be impregnated is a movable or flexible article, e.g., paper or fabric, it is simply passed through or immersed in the liquid impregnating composition and then pressed or wrung out until the desired amount of impregnating medium remains. If toxic solvents are present, these operations should of course be conducted under conditions adapted to the removal of the solvent with a minimum of contact with the operator. The treated material is then allowed to dry more completely by evaporation of solvent or water under suitable conditions. In the case of fabrics or clothing treated with either aqueous or organic solvent dispersions, it is satisfactory to employ equipment ordinarily used for dry cleaning purposes and consisting essentially of a perforated rotating cylinder with the necessary attached shell, centrifuge, and rotary tumbling drier.

The following examples, in which parts given are by weight, illustrate specific embodiments of the invention. The invention is not limited to these particular examples.

EXAMPLE I

Eight and one-half (8½) parts of N,N'-di-(2,4,6-trichlorophenyl)-N,N'-dichlorourea and 6.5 parts of chlorinated paraffin wax (42% chlorine) are dissolved in 83 parts of tetrachloroethane at a temperature of 60° C. To this solution are added 1.7 parts of zinc oxide of the ordinary commercial grade used in rubber compounding and 0.02 part of soya lecithin. This mixture is then passed through a colloid mill in order to disperse the zinc oxide uniformly in the tetrachloroethane solution. The resulting dispersion may be applied to cellulosic materials, especially fabrics, as follows:

Cotton fabric is immersed in the dispersion, removed and placed in a basket centrifuge, and the excess liquid centrifuged off until the weight of the wet fabric is twice that of the untreated material. The damp fabric is then dried at 70° C. in a forced draft oven for 30 minutes. The resulting dry fabric contains 0.5 mg./sq. cm. of titratable chlorine. The finish is laundryfast, resists the penetration of mustard gas vapor for relatively long periods of time, and does not attack the fabric. After exposure to mustard gas vapor until the protective effect of the tertiary N-chlorourea is no longer evident, the fabric still retains substantially all of its original strength, and it can be decontaminated and reused.

EXAMPLE II

Sixteen (16) parts of 1,3,4,6-tetrachloro-3a,6a-dimethylglycoluril of the formula:

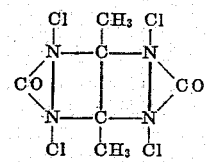

and 25 parts of chlorinated paraffin are dissolved in 1000 parts of tetrachloroethane at about 60° C. To the hot solution are added 16 parts of zinc oxide and 0.25 part of soya lecithin, and the resulting mixture is passed through a homogenizer in order to obtain a uniform dispersion. This composition may be used to impregnate cellulosic materials, especially fabrics and articles of clothing made therefrom, as follows:

Cotton fabric is immersed in the solution, and when thoroughly wetted, is removed and placed in a basket centrifuge, the excess liquid being centrifuged off until the weight of the wet fabric is twice that of the original material. The damp fabric is then dried in a forced draft oven at 70° C. for 30 minutes. Titration of a sample shows it to contain 0.65 mg./sq. cm. of available chlorine. This fabric resists the penetration of mustard gas vapor, retains its strength for long periods, and is suitable for manufacture of gas-proof clothing. After being heated for 48 hours at 70° C. under high humidity conditions, the fabric retains 50% of its available chlorine and has a tensile strength of 79 pounds, whereas a control without zinc oxide retains 10% of its available chlorine and has a tensile strength of 2 pounds.

EXAMPLE III

Ten (10) parts of N,N'-di-(2,4,6-trichlorophenyl)-N,N'-dichlorourea, of average particle size of about 3 microns, 1 part of dibutyl phenyl phenol sodium disulfonate (sold under the trade name of "Aresklene"), 10 parts of chlorinated paraffin wax (42% chlorine), and 1 part zinc oxide of the ordinary commercial grade used in rubber compounding are milled together in an ink mill until a smooth, homogeneous paste with a putty-like consistency is obtained. This composition is packed in sealed containers and, at the time of use, is stirred into water to form a dispersion, about one gallon of water being employed per pound of paste. Clothing treated therewith retains its strength and protective value for practical periods. Storage of the composition for unduly long periods, particularly in hot and moist climates, is to be avoided since, under such conditions, the dispersing agent tends to lose its effectiveness.

EXAMPLE IV

Twelve (12) parts of manganese dioxide, 40 parts of the chloroglycoluril of Example II, 20 parts of 10% aqueous polyvinyl alcohol solution, 2 parts of sodium salt of sulfonated naphthalene-formaldehyde condensation product, and 40 parts of chlorinated paraffin (42% chlorine) are mixed thoroughly in a mortar or mechanical mixer adapted to handle putty-like masses. A thick paste is formed which is placed in a suitable metal or water-resistant container for storage and transportation. At the time and place of use, 66 parts of water is gradually added to the paste with vigorous stirring, and the resulting slurry is poured with continued agitation into 140 parts of water, the whole mixture being stirred for 15 minutes. The final mixture is a stable fluid dispersion of the chloroglycoluril suitable for impregnation of fabrics, or for spraying on walls, floors and the like.

EXAMPLE V

Ten (10) parts of N,N'-di(2,4,6-trichlorophenyl)-N,N'-dichlorourea is mixed with 1 part of zinc oxide by mechanical agitation to give a relatively uniform product. This mixture is passed through an air micronizer in order to reduce the particle size of the N,N'-di-(2,4,6-trichlorophenyl)-N,N'-dichlorourea to less than about 10 microns. The resultant mixture, in comparison with the unstabilized N-chlorourea, has considerably improved stability in the presence of cellulosic materials such as a paper container. This is of considerable importance in connection with the storage and shipping of finely divided tertiary N-chloroureas. For example, when the unstabilized N-chlorourea is placed in an asphalt-laminated fiber drum and stored under conditions of high temperature and humidity (46° C. and 80% R.H.), the container begins to deteriorate after 2 weeks; after one month, the paper crumbles under pressure of the fingers, and the container is so weak as to be totally unsuitable for shipping and handling. In comparison, a similar drum containing the stabilized mixture shows no sign of deterioration for at least six months and is suitable for shipping and handling at the end of that time. The following table shows the percentage loss of active chlorine of the stabilized and unstabilized materials at various intervals of time.

*Table I*

|  | Percentage loss of active chlorine | | |
|---|---|---|---|
|  | 1 month | 3 months | 6 months |
| Unstabilized N,N'- di (2,4,6 - trichlorophenyl)-N,N'-dichlorourea | 9.4 | 38.2 | 55.1 |
| Same, stabilized with 10% zinc oxide | 4.6 | 6.2 | 11.8 |

The dry mixture of N,N'-di(2,4,6-trichlorophenyl)-N,N'-dichlorourea and zinc oxide can, at the time of use, be dispersed in water, or in an aqueous emulsion of a binder such as mineral oil, by the use of a suitable emulsifying agent such as polyvinyl alcohol to give a suspension suited for impregnating cellulosic fabric. This is done conveniently by placing 1100 parts of the above mixture, 50 parts of polyvinyl alcohol and 5 parts of sodium dodecyl sulfate in an open tank and stirring for 5 minutes with a paddle to homogenize the solids. Thirteen hundred (1300) parts of water is added and the mixture is stirred with a paddle for 30 minutes. To the smooth, creamy suspension is then added 750 parts of chlorinated paraffin wax and the suspension is again stirred for 30 minutes. This concentrated suspension is diluted to impregnating strength, e.g., to 10% of chlorourea by weight, and used for impregnating cotton or woolen garments.

EXAMPLE VI

Ten (10) parts of N,N'-di-(2,4,6-trichlorophenyl)-N,N'-dichlorourea, 1 part zinc oxide, and 1 part water-soluble polyvinyl alcohol are ground in a ball mill containing 30 parts of water until the average particle size is approximately 3 microns. An emulsion is prepared separately by passing through a colloid mill a mixture of 7.5 parts chlorinated paraffin wax, 0.75 part of water-soluble polyvinyl alcohol and 15 parts of water. This emulsion is blended with the ball mill dispersion and the mixture diluted with 35 parts of water, whereby a 10% aqueous dispersion of N,N'-di-(2,4,6-trichlorophenyl-N,N'-dichlorourea is obtained. Nine hundred twenty (920) parts of this dispersion, to which is added, as an anti-foam agent, 1.5 parts of the mixture of alcohols obtained by hydrogenating coconut oil, is placed in an impregnator along with 71 parts of cotton uniforms. The uniforms are tumbled for 5 minutes in the impregnating suspension and the excess dispersion is pumped out. The wet, impregnated uniforms are centrifuged for 3 minutes, then tumbled for 90 minutes in a rotary drier at a temperature of 95° C. to improve the uniformity of impregnation and reduce the stiffness of the impregnated garments. These garments resist the penetration of mustard gas vapor for long periods and, at the same time, they retain most or all their original tensile strength, even when the tertiary N-chlorourea has been all neutralized.

EXAMPLE VII

A dispersion (a) is prepared by mixing 400 parts of the chloroglycoluril of Example II, 8 parts of sodium salt of sulfonated naphthalene-formaldehyde condensation product, and 1192 parts of water. A second dispersion (b) is prepared by mixing 700 parts chlorinated paraffin, 14 parts sodium salt of sulfonated naphthalene-formaldehyde condensation product, and 1386 parts water. Eleven hundred twenty-five (1125) parts of (b) is mixed with 2000 parts of (a) to form a third dispersion (c). Thirty (30) parts of dispersion (c), 30 parts of a 16% aqueous chromium acetate solution, and 40 parts of water are mixed thoroughly to form a stable fluid composition which serves as an effective impregnating solution for fabrics or for spraying over selected flat areas.

EXAMPLE VIII

Thirty (30) parts of dispersion (a) of Example VII, 20 parts of dispersion (b) of Example VII, 30 parts of 20% aqueous cobalt acetate solution, and 20 parts of water are thoroughly mixed by mechanical means. The resulting composition is fluid and stable, and is an effective impregnating agent for fabrics.

EXAMPLE IX

Forty (40) parts of the chloroglycoluril of Example II, 20 parts of zinc oxide, 2 parts of manganese acetate, 1.2 parts of sodium salt of sulfonated naphthalene-formaldehyde condensation product, and water to a total of 200 parts are ground in a ball mill for 16 hours, a smooth, fluid slurry being obtained. Eighty (80) parts of a 5% aqueous polyvinyl alcohol solution and 40 parts of chlorinated paraffin are each heated to 70° C., mixed by hand, and the mixture emulsified by passage through a colloid mill. The slurry and emulsion thus separately prepared are mixed thoroughly with mechanical agitation to form the final aqueous dispersion. This is suitable for general decontaminating and sterilizing purposes, and in particular for application to fabrics as anti-vesicant, as follows:

Cotton fabric is immersed in the dispersion and thoroughly wetted with it. The fabric is then wrung mechanically or manually to remove excess dispersion until it weighs approximately twice the original dry weight, following which it is air-dried. This fabric on analysis contains 1.45 mg./cm.$^2$ of active chlorine and shows high resistance to passage of mustard gas. After 96 hours at 70° C. and 100% relative humidity, it retains 68% of its original chlorine and possesses 68 pounds tensile strength.

EXAMPLE X

A mixture of 48 parts of 1,3,4,6-tetrachloro-3a,6a-diphenylglycoluril, 4.8 parts of zinc oxide, and 0.96 part of sulfonated naphthalene-formaldehyde condensation product is ground in a pebble mill in the presence of 190 parts of water for 6 hours. The resulting aqueous dispersion is blended with a separately prepared emulsion containing 36 parts of chlorinated paraffin wax, 3.6 parts of water-soluble polyvinyl alcohol, and 68.4 parts of water. The mixture thus obtained may be used to impregnate cellulosic fabrics, paper and the like, as follows:

White cotton cloth is immersed in the dispersion and agitated until thoroughly wet. It is then removed and the excess liquid squeezed out by passing through rolls with the tension so adjusted as to give a wet:dry ratio of 2:1 on the fabric. The damp fabric is dried first in air and then for 30 minutes at 70° C. in a forced draft oven. The resulting fabric is soft and has a pleasant feel. Titration shows it to contain 0.88 mg. of available chlorine per sq. cm. It is resistant to passage of mustard gas vapor and retains substantially all its tensile strength for considerable periods.

EXAMPLE XI

Ten (10) parts of 1,3,4,6-tetrachloro-3a-methyl-6a-phenylglycoluril, 2 parts of zinc oxide and 0.2 part of sulfonated naphthalene-formaldehyde condensation product are ground in a pebble mill for 4 hours in the presence of 70 parts of water. The resulting dispersion is blended with a separately prepared emulsion containing 75 parts of chlorinated paraffin, 0.75 part of water-soluble polyvinyl alcohol, and 13.25 parts of water. The resulting composition may be used to impregnate cotton cloth, e.g., by the method of Example X, with similar results. The treated fabric thus obtained has upon analysis 1.14 mg. of available chlorine/sq. cm.

EXAMPLE XII

To 38 parts of a 6% aqueous solution of polyvinyl alcohol is added 2 parts of the sodium salt of sulfonated naphthalene-formaldehyde condensation product, and the resulting solution placed in a mixing tank fitted with a high speed stirrer. To the solution, at about 25° C. and over a period of 2 hours, is added 40 parts chlorinated paraffin wax (42% chlorine), continuously and with stirring. The resulting cream-colored emulsion is diluted with 20 parts water and recycled through a gear pump for about 1½ hours, 40 parts more of water then being added. To this latter emulsion is added, portion-wise and with vigorous stirring, first 40 parts of the solid finely divided chloroglycoluril of Example II and then 20 parts of zinc oxide, this mixture being passed through a gear pump for about 1½ hours. There is thus obtained a concentrated "stock" impregnating suspension, which can be diluted at the time and place of use to whatever strength is necessary for the type of fabric used and the fabric loading desired. Thus, for cotton underwear, 35 parts by volume of the stock suspension would be diluted with water to a total of about 150 parts by volume, whereby a suspension having about 4.5% of the chloroglycoluril is obtained. For outer garments such as coveralls, the concentration should be adjusted to about 8.2%, and for cotton gloves about 2% is satisfactory. These concentrations will give, for the different types of fabrics a loading of about 1.5 to 1.6 mg. active chlorine per sq. cm. Such fabrics resist the passage of mustard gas vapor and retain their strength over prolonged periods. Compositions giving excellent aging properties to fabrics are obtained by using 1,3,4,6-tetrachloro-3a,6a,-dimethyl glycoluril, zinc oxide, "Tamol NNO" (a sulfonated naphthalene-formaldehyde condensation product) and polyvinyl alcohol in the respective ratios of 100:20–50:20–50:1.5–5, preferably in the approximate ratio 100:25:20:5.

EXAMPLE XIII

Twelve (12) parts manganese acetate, 20 parts 10% aqueous polyvinyl alcohol solution, and 40 parts chlorinated paraffin are ground together to form a thick paste. Then 68 parts of water is added portion-wise with vigorous stirring. After 15 minutes agitation, the entire slurry is poured into 140 parts of water, vigorous stirring being maintained for 15 minutes more. Forty (40) parts of the pulverized chloroglycoluril of Example II is then stirred into the dispersion, vigorous agitation being maintained. A stable fluid dispersion is obtained suitable for impregnations or spraying.

EXAMPLE XIV

One hundred (100) parts of finely divided 1,1'-methylene-bis-(3-chloro-5,5-dimethylhydantoin), 20 parts of zinc oxide, 2 parts of sodium salt of sulfonated naphthalene-formaldehyde condensation product, and 150 parts of water are stirred in a mixing tank for 10 to 15 minutes, or until a uniform slurry is obtained. This aqueous slurry is blended with a separately prepared emulsion of 100 parts of chlorinated paraffin wax, 200 parts of a 5% aqueous solution of polyvinyl alcohol, and 2 parts of sodium salt of a sulfonated naphthalene-formaldehyde condensation product, the resulting blend being diluted with 90 parts of water and stirred well. The 15% aqueous dispersion thus obtained is suitable for impregnation of heavy fabrics to prevent passage of mustard vapor therethrough. The treated fabrics show excellent retention of active chlorine and tensile strength when stored for a month or more under simulated tropical conditions of temperature and humidity.

EXAMPLE XV

A mixture of 1000 parts of finely ground N,N'-di-(2,4,6-trichlorophenyl)-N,N'-dichlorourea, 100 parts of zinc oxide, and 750 parts of chlorinated paraffin wax is placed in a Werner and Pfleiderer mixer or other equipment adapted to the blending of viscous pastes, and mixed for one hour. Five hundred (500) parts of a 10% polyvinyl alcohol solution in water is added and mixing continued for 30 minutes. The viscous pasty mass is diluted by the addition of 650 parts of water and the fluid suspension may then be readily discharged from the mixer. This suspension is characterized by the unusually fine particle size of the chlorinated paraffin globules, the majority of which are reduced to a diameter of less than 3 microns. The concentrated dispersion may be diluted to any desired strength and is then suitable for the impregnation of fabrics, including woolen fabrics, garments and the like.

EXAMPLE XVI

Five hundred (500) parts of tetrachloroethylene, 1.5 parts of the calcium salt of a sulfonated petroleum oil, and 750 parts of chlorinated paraffin wax are charged into a tank and stirred with a high speed stirrer. To the homogeneous solution thus obtained is added 1000 parts of finely divided N,N'-di-(2,4,6-trichlorophenyl)-N,N'-dichlorourea, and 100 parts of zinc oxide. The mixture is stirred for 1 hour. This results in a smooth, fluid, anhydrous paste. To the anhydrous paste is added 1000 parts of a 5% solution of polyvinyl alcohol, and the mixture is stirred with a high speed stirrer for 1 hour. A homogeneous, stable suspension is thus formed which may be diluted to any desired strength and used for the treatment of garments, including woolen garments, to render them resistant to mustard gas.

Table II below shows results of accelerated aging tests carried out on fabrics impregnated with the compositions of some of the examples. These tests were in general conducted by placing the treated fabric in a sealed bottle with a source of moisture, heating the bottle to 70° C., and removing the fabric for test after the desired periods of time. The relative humidity is kept at the desired value (variable with strength of agent and time within which results are desired) by means for providing different amounts of moisture, the same means, of course, being used for the control (measurements for Examples X and XI carried out at higher humidities than for the other examples). These data, which are typical of a very large number of evaluations which have been carried out, show clearly that the stabilizer (zinc oxide in the illustrated case) retards loss of chlorine from the tertiary N-chlorourea on the fabric, and prevents or greatly retards weakening of the fabric to which the tertiary N-chlorourea has been applied.

Table II
EFFECTS OF ACCELERATED AGING ON IMPREGNATED FABRICS

| Example | Behavior of Stabilized Sample | | | | Behavior of Control Without ZnO | | | |
|---|---|---|---|---|---|---|---|---|
| | Percent Cl Retained [1] | | Percent Tensile Strength Retained [2] | | Percent Cl Retained [1] | | Percent Tensile Strength Retained [2] | |
| | 48 hrs. | 72 hrs. | 48 hrs. | 72 hrs. | 48 hrs. | 72 hrs. | 48 hrs. | 72 hrs. |
| I | 86 | 62 | 100 | 96 | 20 | 1 | 10 | 2 |
| II | 50 | | 79 | | 10 | | 2 | |
| V | 65 | 59 | 100 | 100 | 18 | 0 | 10 | 1 |
| VI | 70 | 50 | 100 | 98 | 13 | 0 | 10 | 1 |
| X | 83 | | 90 | | 70 | | 20 | |
| XI | 43 | | 55 | | 2 | | 1 | |

[1] Residual amount of "active" or titratable chlorine as measured by the amount of iodine liberated from potassium iodide. A known area of fabric is extracted with a tetrachloroethane-acetic acid mixture (3:2 by volume); excess potassium iodide solution is added; and the iodine which is liberated is titrated with standard sodium thiosulfate solution.
[2] Ratio of the tensile strength of the fabric after aging to the tensile strength of the original fabric before impregnation. In each case, the measurement is made in the filling direction using the standard A.S.T.M. Grab tensile test.

The preferred methods of compounding and using the tertiary N-chlorourea/stabilizer compositions of this invention are illustrated in the above examples. Still others which can be employed are as follows:

The aqueous dispersions, for example, can be made by mixing stabilizer, dispersing agent, binder, and preferably a small amount of water in a suitable mixing device, whereby a self-emulsifiable paste is formed, this paste then being emulsified in water and the finely divided tertiary N-chlorourea stirred into the resulting emulsion. A further method of fabric impregnation consists in applying the stabilizer to the fabric and then treating the fabric with an aqueous dispersion of the tertiary N-chlorourea and binder. This pre-impregnation with the stabilizer can be carried out from an aqueous or organic medium, or the stabilizer actually to be used can be formed on the fabric, as by impregnation with an aqueous solution of a soluble salt of the element of atomic number 24 to 30, precipitating the hydroxide by addition of a suitable base, and drying. Still another process is to treat the fabric first with an aqueous dispersion of the stabilizer and tertiary N-chlorourea, then with an emulsion or solution of the binder. It is also possible to print a mixture of stabilizer and the tertiary N-chlorourea onto the fabric or paper from suitable printing pastes.

Any salt of an element of atomic number 24 to 30 with an acid of dissociation constant less than about $1.5 \times 10^{-2}$, which salt is substantially non-reactive with the tertiary N-chlorourea under conditions of formulation, can be employed as the stabilizer. Oxides of these elements are included since water is a weak acid with a dissociation constant of about $1.0 \times 10^{-7}$. These compounds retard loss of active chlorine from the tertiary N-chlorourea in contact with the fabric and offset whatever chemical changes which otherwise take place to cause tendering of the fabric. One or more such compounds may be used, among them the following: manganese dioxide, phosphate, acetate, carbonate naphthenate and salicylate; zinc oxide, peroxide, borate, silicate, carbonate, acetate, lactate, stearate, benzoate, naphthenate, salicylate, pectate, alginate, and phytate; chromium acetate; cobalt acetate, carbonate, naphthenate, and hydroxide; nickel hydroxide, borate, phosphate, silicate, and octyl phthalate; ferric hydroxide, and ferrite yellow; copper hydroxide, acetate, stearate, etc. Obviously, the stabilizers must be substantially inert toward the tertiary N-chlorourea under the conditions of formulation. Whether or not a given compound fulfills the requirement of inertness is usually apparent from its chemical structure. For example, it is known that the amino group reacts with positive halogen, and therefore salts of amino acids are excluded from consideration. In instances where possible reactivity of the stabilizer is not apparent on mere inspection of its formula, the following simple test may be used. A tertiary N-chlorourea in finely divided form is mixed intimately with 10% of its weight of the compound to be tested, and the mixture is placed in a tightly sealed glass bottle. If, after storage for six hours at 60° C., the tertiary N-chlorourea retains at least 95% of its original active chlorine, as determined by iodine titration, the candidate stabilizer is considered to be substantially non-reactive toward the N-chlorourea. By means of the above-described test, it is possible to exclude at once the unsuitable compounds, examples of which are the salts, with elements of atomic number 24 to 30, of such acids as hydrogen sulfide, hydrogen selenide, arsenious acid, hydroquinone or ethylenically unsaturated acids.

The most useful stabilizers have been found to be compounds having the general formula

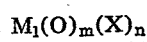

$$M_l(O)_m(X)_n$$

where M is an element of atomic number 24 to 30; O is oxygen; X is hydrogen, boron, carbon or an unsubstituted acyl radical free from non-benzenoid unsaturation; $l$ and $m$ are integers; $n$ is zero or an integer; and the relation between $l$, $m$ and $n$ is such as to satisfy the valence of the element M and of the radical X. Examples of such compounds, which are preferred for use in accordance with this invention, are the oxides, carbonates, acetates and naphthenates of elements of atomic number 24 to 30, of which the most useful are zinc and manganese. Of these compounds, zinc oxide is the preferred one.

The proportion of the stabilizer may be as little as 1% or as much as 200% (based on the weight of the tertiary N-chlorourea) depending on such factors as: (a) the percent active chlorine in the tertiary N-chlorourea to be used; (b) the length of the period desired for useful life of the fabric; (c) the anticipated time and severity of exposure; (d) the method of application; and (e) the effectiveness of the particular stabilizer chosen. As to (a), the greater the per cent active chlorine, in general the more stabilizer needed; for example, the optimum amount of zinc oxide for the tertiary N-chlorourea of Example I is about 10–20% based on the weight of the tertiary N-chlorourea, while the optimum for that of Example II is about 20–50%. As to (b), the life of the fabric is in general directly proportional to the amount of the stabilizer, and the maximum amount which will not affect other properties, such as stiffness and feel, would normally be chosen. As to (c), maximum stability within short periods is attained with relatively small amounts of the stabilizer, e.g., about 5% zinc oxide with the tertiary N-chlorourea of Example I, and the requirements in this respect must be balanced against those under (a) and (b). As to (d), lesser amounts of the stabilizer will usually be needed when it is finely divided and highly dispersed. As to (e), lesser amounts of zinc and manganese compounds, especially their oxides, are required than of compounds of other elements of atomic number 24 to 30, which are in general less effective. Actually there is no limit to the amount of stabilizer which can be used except as may be determined by practical considerations.

In selecting the type of agent to provide the "active" chlorine, any tertiary N-chlorourea can, so far as is known, be used. The urea nitrogens should be hydrogen-free, i.e., tertiary, and at least one of them should be joined to a chlorine atom. The carbons directly attached to the urea nitrogens should preferably also be hydrogen-free since this type of tertiary N-chlorourea has less tendency toward chemical rearrangement to a differing compound. Illustrative of this class are the bicyclic compounds known as glycolurils which are derived from urea and alpha, beta diketones and have the following formula wherein R and R′ are the ketone residues:

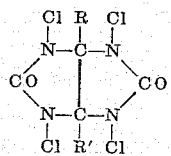

These compounds combine a high percentage of active chlorine with relatively high stability against rearrangement. Specific tertiary-N-chloroureas which can be used instead of those of the examples in the practice of the invention are:

N,N′-di-(2,6-dimethylphenyl)-N,N′-dichlorourea
N,N′-di(2,6-dichlorophenyl)-N,N′-dichlorourea
N,N-diphenyl-N′-chloro-N′-(2,6-dimethylphenyl)urea
1,3,4,6-tetrachloro-3a,6a-diethylglycoluril
1,3,4,6-tetrachloro-5-imino-3a,6a-dimethylglycoluril
5,5-dimethyl-1,3-dichlorohydantoin
5,5-diphenyl-1,3-dichlorohydantoin
5-methyl-5-isobutyl-1,3-dichlorohydantoin
1,3,5-trichloro-s-triazinetrione
1,1′ - methylene - bis - (3 - chloro - 5 - methyl - 5 - isobutylhydantoin), and
1,1′-methylene-bis-(3-chloro-5,5-dimethylhydantoin)

Both the tertiary N-chlorourea and the stabilizer should, for best results, be employed in finely divided form, i.e., an average particle size of less than about 10 microns. Some of the tertiary N-chloroureas, in particular that of Example I, are difficult to obtain or prepare in this form, and must usually be subjected to some appropriate preliminary treatment, such as passage through an air micronizer, or by a preliminary wet pebble mill grinding followed by dry disintegration. If the finely divided tertiary N-chlorourea is not to be used for some time, the crude material is desirably micronized or ground with a small amount of the stabilizer.

A variety of dispersing agents can be employed. For best results, the dispersing agent or agents used should be chosen in the light of the dispersing medium (aqueous or organic), and of the auxiliary components present, especially the binder. In organic solvent media, which in general dissolve all components except the stabilizer and any pigments present, dispersing agents for the latter materials which may be used include soya lecithin and the calcium salt of sulfonated petroleum oil. In aqueous dispersions or in pastes to be emulsified in water (both of which generally contain water-insoluble binders such as chloroparaffin), non-ionic, polyhydroxylated protective colloids may be employed as dispersing agents, among them polyvinyl alcohol, strach, methyl starch, starch acetate, flour paste, dextrin, incompletely methylated celluloses, cellulose glycollic acid, and certain vegetable gums such as gum arabic, gum tragacanth, "Galogum," and "Lupogum." Of these dispersing agents, polyvinyl alcohol (i.e., any water-soluble partly or completely hydrolyzed polyvinyl ester, preferably a highly viscous partially hydrolyzed polyvinyl acetate having a saponification number of about 130 to 160) gives outstanding results in that it can be employed under practically any of the numerous and often quite crude conditions under which aqueous dispersions are formulated and used (e.g., with sea water of various degrees of contamination), and in that it can be employed with auxiliary components of all kinds and of all degrees of purity; also, unlike many of the other polyhydroxylated, non-ionic polymeric dispersing agents, polyvinyl alcohol does not cause any appreciable loss of active chlorine from the tertiary N-chlorourea, before or after the dispersion is applied to the fabric. It has the further advantage that it can function both as the dispersing and as the binding agent.

In aqueous systems, the alkali metal salts of sulfonated naphthalene-formaldehyde condensation products, such as those having the trade names "Daxad–11," "Tamol NNO," "Darvan–1," "Foamapin," and "Fastan Niocet," are also highly effective dispersing agents, and they are in face desirably employed, even though other dispersing agents may be present, since their combination with the stabilizer (especially zinc compounds and in particular zinc oxide) gives compositions which retain their active chlorine to a greater degree than analogous compositions from which they are omitted; they are, however, relatively poor dispersing or emulsifying agents for binders such as chloroparaffin, and, if binders are present, polyvinyl alcohol or another material which will emulsify them should be additionally employed. Still other dispersing agents which can be used in special cases in aqueous or organic systems include ionic types such as sulfonated lignin, sulfonated alkylbenzenes and alkylnaphthalenes, sulfated long chain alcohols, and hydrolyzed reaction products of mineral oils with chlorine and sulfur dioxide.

A binder is not essential but is usually desirable. For this purpose any substantially non-volatile, usually water-insoluble material which is a solvent for mustard gas, is non-reactive toward the tertiary N-chlorourea, and preferably is a highly viscous liquid or semi-solid at room temperature, can be used. Suitable binders in addition to the chlorinated paraffin of the examples are polyisobutylene, chlorinated polyisobutylene, mineral oil, paraffin, motor oil and chlorinated stearic acid. As employed herein, these binders do not form a continuous paint-like film on the object or material to which the impregnating composition is applied. Their purpose is to attach the stabilized tertiary N-chlorourea to the material being treated in such manner, i.e., as active, discrete particles, that the active chlorine will be readily available for its intended purpose, e.g., neutralization of the vesicant. More specifically, in the case of impregnated fabrics, it is essential that air-permeability be retained if the fabric is to be of use as clothing. Therefore, the binders, when used, are either of the type which normally do not form a continuous, solid, non-porous film or are used in amounts insufficient to form such a film. The term "impregnating composition" as used herein is intended to means that the compositions of this invention are of such type, and not paints.

Suitable solvents in which the impregnating mixture can be dispersed comprise any volative solvent for the tertiary N-chlorourea which is non-reactive therewith under conditions of formulation. In addition to the tetrachloroethane of the examples, other chlorinated hydrocarbons, such as tetrachloroethylene, dichloromethylene, ethylene dichloride, chlorobenzene, and chloroform, can be used, also ethers such as dioxane and glycol dimethyl and diethyl ethers, and hydrocarbon mixtures such as gasoline, Stoddard solvent, kerosene, and the like. If desired, organic solvents, particularly tetrachloroethylene, may be added to aqueous emulsions to facilitate impregnation.

In preparing dispersions on a large scale, anti-foam agents are often needed, and long chain alcohols, in particular lauryl alcohol or the mixtures obtained by hydrogenating fatty oils such as coconut oil, are suitable for this purpose. Other materials which can be included, as needed and desired, are textile waterproofers, adhesives to improve wash-fastness, non-irritant agents as disclosed in U.S. 1,820,607, and pigments and dyes to produce any desired color, e.g. yellow iron oxide, certain chromites, phthalocyanines, or anthroaquinone dyes.

While the compositions of this invention are designed specifically for treatment of cellulosic fibers and fabrics to render them resistant to vesicant vapors without causing loss of tensile strength, they may also be applied with similar and other results to any other cellulosic web, such as paper, and to other cellulosic materials, or manufactures therefrom, such as regenerated cellulose fibers and films, cotton, cellulose derivatives, wooden surfaces, and the like. From such treated materials may be made such articles as bandages having a long effective life, window shades and wall paper for hospitals and similar buildings, and coverings for any area or surface where slow controlled liberation of chlorine is desired. Other uses of this type will suggest themselves to those skilled in the art and are included in the scope of the invention.

The compositions of this invention may also be used in other ways as anti-vesicants. Thus, they can be employed in the form of ointments for application to the skin to minimize the effect of exposure to the vesicant, or they can be scattered as a powder or slurry over areas and surfaces which have been contaminated with the vesicant.

The compositions of this invention are for several reasons of particular value in the preparation of air-permeable clothing. The most important is that the fabric is rendered resistant to attack by the tertiary N-chlorourea decomposition products and/or reaction products with the vesicant, there being as a consequence no loss of tensile strength; moreover, it is usually possible to reimpregnate and reuse the fabric after the tertiary N-chlorourea thereon has been consumed by exposure to the vesicant. Also, the high available chlorine is retained in the fabric for longer periods than previously possible, thus lengthening its useful life. A still further point is that the compositions of the invention, in the form of aqueous dispersions containing the usual binders, do not, upon being applied to fabrics, break up with formation of oil spots and a mottled appearance. Moreover, the compositions themselves are not subject to settling and caking in any substantial amount prior to the time they would normally be used, and any settled solid material is readily redispersible. Lastly and more specifically, the combination of the stabilizer with an alkali metal salt of sulfonated naphthalene-formaldehyde condensation products gives a particularly high level of retention of chlorine and tensile strength in the fabric.

As many apparently widely different embodiments of this invention may be made without departing from the spirit and scope thereof, it is to be understood that I do not limit myself to the specific embodiments thereof except as defined in the appended claims.

I claim:
1. A chlorine-liberating mixture of (1) a chlorine-liberating tertiary N-chlorourea and (2) 1–200% by weight, based on the weight of said N-chlorourea, of a stabilizer, substantially nonreactive with the N-chlorourea under the conditions of formulation, selected from the group consisting of oxides of elements having an atomic number between 24 and 30, inclusive, hydroxides of said elements, and salts of said elements with acids having a dissociation constant less than about $1.5 \times 10^{-2}$.
2. The mixture of claim 1 wherein the stabilizer is zinc oxide.
3. The mixture of claim 1 wherein the tertiary N-chlorourea is 1,3,4,6-tetrachloro-3a,6a-dimethylglycoluril.
4. The mixture of claim 3 wherein the stabilizer is zinc oxide.
5. The mixture of claim 1 wherein the tertiary N-chlorourea is N,N'-di(2,4,6-trichlorophenyl)-N,N'-dichlorourea.
6. The mixture of claim 5 wherein the stabilizer is zinc oxide.
7. The mixture of claim 1 in the form of a dispersion in an inert organic medium.
8. The mixture of claim 1 wherein the stabilizer is chromium carbonate.

References Cited in the file of this patent
UNITED STATES PATENTS

| | | |
|---|---|---|
| 1,839,168 | Stampe | Dec. 29, 1931 |
| 1,968,796 | Bertsch | July 31, 1934 |
| 2,127,320 | Alt | Aug. 16, 1938 |

FOREIGN PATENTS

| | | |
|---|---|---|
| 557,081 | Germany | Aug. 18, 1932 |
| 588,131 | Germany | Nov. 13, 1933 |
| 496,734 | Great Britain | Dec. 5, 1938 |

OTHER REFERENCES

Polyvinyl Alcohol, "Properties, Uses and Applications," an R&H Technical Bulletin, E. I. Du Pont de Nemours & Co., Inc., copyright 1940.

Ind. Eng. Chem., vol. 33, No. 1, January 1941, pages 16–21, "Surface-Active Agents."

UNITED STATES PATENT OFFICE
CERTIFICATE OF CORRECTION

Patent No. 3,003,971            October 10, 1961

William W. Prichard

It is hereby certified that error appears in the above numbered patent requiring correction and that the said Letters Patent should read as corrected below.

Column 1, lines 14 to 19 should appear as shown below instead of as in the patent:

> This application is a continuation-in-part of my application Serial No. 474,629 filed February 3, 1943, now abandoned, of my application Serial No. 487,532 filed May 18, 1943, now Patent No. 2,988,526, and of my application Serial No. 487,533 filed May 18, 1943, now abandoned.

Signed and sealed this 11th day of December 1962.

(SEAL)
Attest:

ERNEST W. SWIDER            DAVID L. LADD
Attesting Officer            Commissioner of Patents